(12) United States Patent
Sano

(10) Patent No.: US 12,176,843 B2
(45) Date of Patent: Dec. 24, 2024

(54) CONTROL APPARATUS FOR ELECTRIC POWER GENERATION SYSTEM

(71) Applicant: DENSO CORPORATION, Kariya (JP)

(72) Inventor: Tomohisa Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 17/963,418

(22) Filed: Oct. 11, 2022

(65) Prior Publication Data

US 2023/0045217 A1 Feb. 9, 2023

Related U.S. Application Data

(63) Continuation of application No. PCT/JP2021/013586, filed on Mar. 30, 2021.

(30) Foreign Application Priority Data

Apr. 9, 2020 (JP) ................. 2020-070302

(51) Int. Cl.
| | |
|---|---|
| B60L 53/14 | (2019.01) |
| B64D 27/24 | (2006.01) |
| B64D 31/00 | (2006.01) |
| H02J 7/14 | (2006.01) |
| H02P 9/02 | (2006.01) |
| H02P 29/60 | (2016.01) |
| B64C 29/00 | (2006.01) |

(52) U.S. Cl.
CPC ............... *H02P 9/02* (2013.01); *B64D 27/24* (2013.01); *B64D 31/00* (2013.01); *H02J 7/14* (2013.01); *H02P 29/60* (2016.02); *B64C 29/0008* (2013.01)

(58) Field of Classification Search
CPC .......... H02P 9/02; H02P 29/60; B64D 27/24; B64D 31/00; H02J 7/14; B64C 29/0008; B60L 53/14; B60L 50/16
See application file for complete search history.

(56) References Cited

U.S. PATENT DOCUMENTS

| | | | | |
|---|---|---|---|---|
| 2010/0107608 | A1* | 5/2010 | Mitsutani | ................ B60L 50/16 60/299 |
| 2020/0171973 | A1* | 6/2020 | Perkins | ................... B60L 53/14 |
| 2021/0171009 | A1* | 6/2021 | Lechlitner | ............. B60W 10/08 |

FOREIGN PATENT DOCUMENTS

| | | | | |
|---|---|---|---|---|
| CN | 106852184 B | * | 9/2019 | ......... G01R 19/0092 |
| JP | 2005-143232 A | | 6/2005 | |

\* cited by examiner

*Primary Examiner* — Cortez M Cook
(74) *Attorney, Agent, or Firm* — Oliff PLC

(57) ABSTRACT

Disclosed is a control apparatus for an electric power generation system. The electric power generation system is configured to generate electric power and thereby charge a secondary battery that is an electric power source of a motor included in an electric drive system. The electric drive system further includes an inverter circuit for driving the motor and a power transmission unit for transmitting electric power from the secondary battery to the inverter circuit. The control apparatus includes a temperature acquisition unit and a power generation control unit. The temperature acquisition unit is configured to acquire a temperature of the power transmission unit. The power generation control unit is configured to control the electric power generation system to generate electric power and thereby charge the secondary battery when the temperature of the power transmission unit acquired by the temperature acquisition unit is higher than or equal to a predetermined threshold temperature.

9 Claims, 3 Drawing Sheets

CONTROL APPARATUS FOR ELECTRIC POWER GENERATION SYSTEM

CROSS-REFERENCE TO RELATED APPLICATIONS

The present application is a continuation application of International Application No. PCT/JP2021/013586 filed on Mar. 30, 2021, which is based on and claims priority from Japanese Patent Application No. 2020-070302 filed on Apr. 9, 2020. The entire contents of these applications are incorporated by reference into the present application.

BACKGROUND

1 Technical Field

The present disclosure relates to control apparatuses for electric power generation systems.

2 Description of Related Art

Conventionally, various methods have been proposed to suppress temperatures of power semiconductor elements, such as transistors employed in inverter circuits, from becoming excessively high and thereby protect the power semiconductor elements.

SUMMARY

According to the present disclosure, there is provided a control apparatus for an electric power generation system. The electric power generation system is configured to generate electric power and charge a secondary battery, which is an electric power source of a motor included in an electric drive system, with the generated electric power. The electric drive system further includes, in addition to the motor, an inverter circuit configured to drive the motor and a power transmission unit configured to transmit electric power from the secondary battery to the inverter circuit. The control apparatus includes a temperature acquisition unit and a power generation control unit. The temperature acquisition unit is configured to acquire a temperature of the power transmission unit. The power generation control unit is configured to control the electric power generation system to generate electric power, when the temperature of the power transmission unit acquired by the temperature acquisition unit is higher than or equal to a predetermined threshold temperature, and charge the secondary battery with the generated electric power.

DESCRIPTION OF EMBODIMENTS

Figure 1:
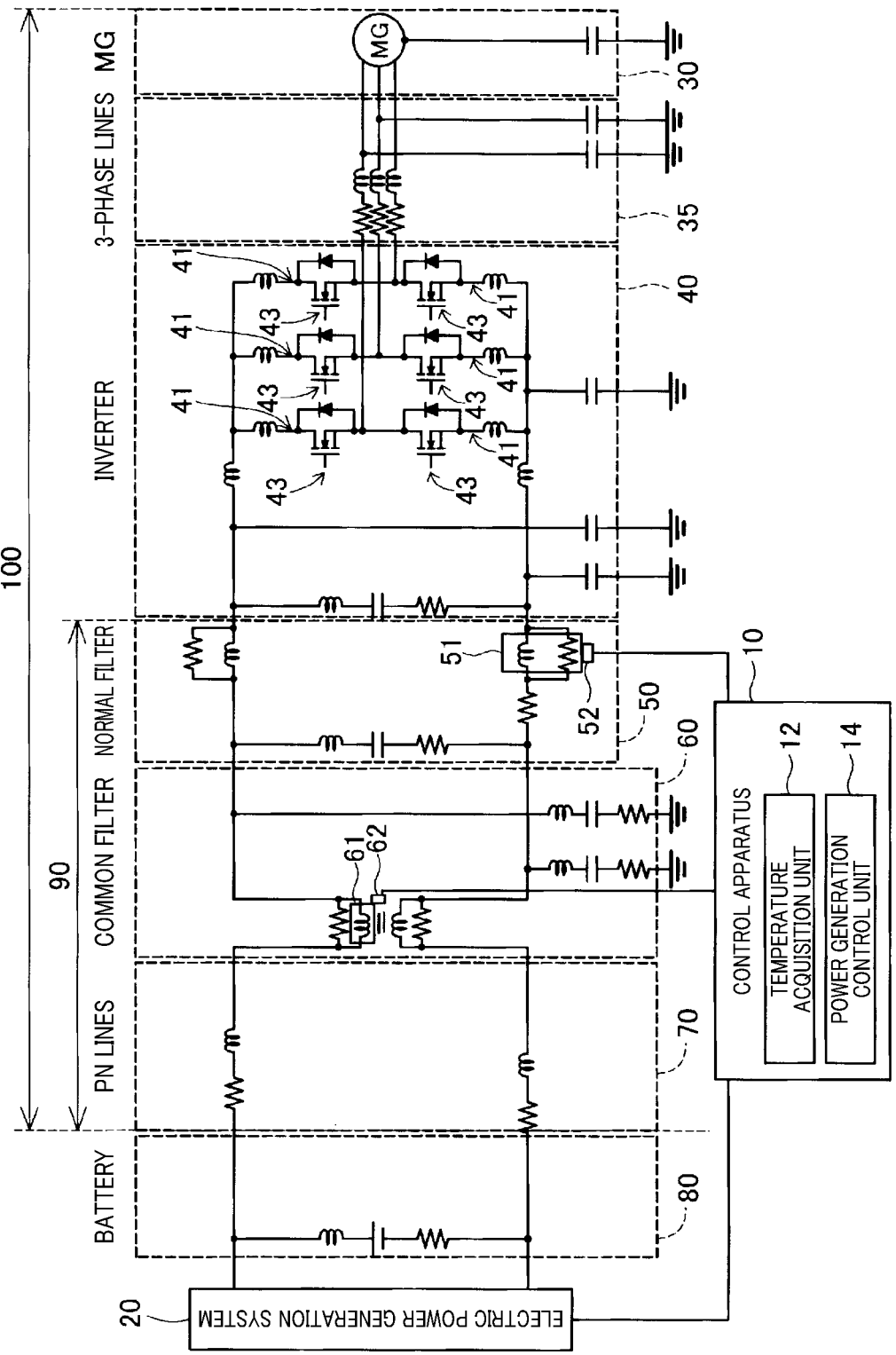
FIG. 1 is a schematic diagram illustrating the configuration of a control apparatus according to a first embodiment of the present disclosure.

Japanese Patent Application Publication No. JP 2005-143232 A discloses a method of performing a current limiting operation for an inverter circuit and thereby protecting power semiconductor elements employed in the inverter circuit. Specifically, according to the method, when a junction temperature of the power semiconductor elements exceeds a preset temperature, a current limiter performs the current limiting operation for the inverter circuit. Consequently, increase in the temperatures of the power semiconductor elements is suppressed, thereby protecting the power semiconductor elements.

With electrification of moving objects and the like, electric drive systems (generally abbreviated to EDSs), which typically include a motor and an inverter circuit, have been used in various applications. For example, electric drive systems are used to rotationally drive rotary wings of electric aircraft, screw propellers of ships and wheels of automobiles and electric trains. Electric aircraft include, for example, manned or unmanned aircraft called eVTOLs (i.e., electric Vertical Take-Off and Landing aircraft). In an electric drive system, DC power is supplied from a secondary battery to the inverter circuit via a power transmission unit, and converted into AC power in the inverter circuit; then, the resultant AC power is supplied to the motor. However, with such a configuration, not only the temperature of the inverter circuit but also the temperature of the power transmission unit may become excessively high due to the electric power supply; therefore, it is required to protect both the inverter circuit and the power transmission unit. In a moving object on the ground such as an automobile or an electric train, if the method disclosed in the above patent document is applied to limit the electric power supply to the inverter circuit when the temperature of the power transmission unit becomes excessively high, the limiting of the electric power supply will merely cause the driving performance of the moving object to be lowered. On the other hand, in an electric aircraft, it may be impossible to limit the electric power supply to the inverter circuit because the electric aircraft is in flight. However, the protection of power semiconductor elements of the inverter circuit and the power transmission unit when it is impossible to limit the electric power supply to the inverter circuit has not been taken into account in the method disclosed in the above patent document. Therefore, it is desired to develop a technique capable of suppressing increase in the temperature of the power transmission unit while maintaining the electric power supply to the inverter circuit.

The present disclosure has been accomplished in view of the above circumstances.

The above-described control apparatus according to the present disclosure includes the temperature acquisition unit configured to acquire the temperature of the power transmission unit, and the power generation control unit configured to control the electric power generation system to generate electric power, when the temperature of the power transmission unit acquired by the temperature acquisition unit is higher than or equal to the predetermined threshold temperature, and charge the secondary battery with the generated electric power. With such a configuration, when the temperature of the power transmission unit is higher than or equal to the predetermined threshold temperature, it is possible to suppress decrease in the output voltage (or the inter-terminal voltage) of the secondary battery by charging the secondary battery with the electric power generated by the electric power generation system. Consequently, in the case of the supplied electric power being constant, it is possible to suppress increase in the electric current flowing through the power transmission unit. As a result, it is possible to suppress increase in the temperature of the power transmission unit while maintaining the supplied electric power.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

FIG. 1 illustrates the configuration of a control apparatus 10 according to the first embodiment of the present disclosure. As shown in FIG. 1, the control apparatus 10 is configured to acquire a temperature detected by a thermistor 52 or a thermistor 62, both of which are mounted to an Electric Drive System (EDS) 100, and control an electric power generation system 20 according to the acquired temperature.

In the present embodiment, the control apparatus 10, the electric power generation system 20, a battery 80 and the EDS 100, all of which are schematically shown in FIG. 1, are installed in an eVTOL. The eVTOL is configured as a manned aircraft that is electrically driven by the EDS 100 and can take off and land vertically.

Moreover, in the present embodiment, the control apparatus 10 is configured with a microcomputer which includes a CPU, a ROM and a RAM. The CPU functions as both a temperature acquisition unit 12 and a power generation control unit 14 by executing a control program stored in the ROM in advance.

The temperature acquisition unit 12 acquires a temperature of a power transmission unit 90. More particularly, in the present embodiment, the temperature acquisition unit 12 acquires a temperature of a normal filter 50 of the power transmission unit 90 as the temperature of the power transmission unit 90; the temperature of the normal filter 50 is detected by the thermistor 52.

The power generation control unit 14 determines whether the temperature of the power transmission unit 90 acquired by the temperature acquisition unit 12 is higher than or equal to a predetermined threshold temperature. Further, when the temperature of the power transmission unit 90 is determined to be higher than or equal to the predetermined threshold temperature, the power generation control unit 14 causes the electric power generation system 20 to generate electric power and causes the battery 80 to receive the electric power generated by the electric power generation system 20. The power generation control unit 14 controls the electric power generation system 20 so as to cause a motor 30 of the EDS 100 to output mechanical power required for flight of the eVTOL. More specifically, the power generation control unit 14 controls the electric power generation system 20 to generate electric power, thereby enabling the motor 30 to output mechanical power higher than a predetermined threshold value. As a result, in any case, the motor 30 can continuously output mechanical power required for flight of the eVTOL.

The electric power generation system 20 includes an electric generator (not shown). The electric generator of the electric power generation system 20 generates electric power under the control of the control apparatus 10 and charges the battery 80 with the generated electric power. In addition, the electric power generation system 20 may be, for example, implemented by an electric power generation system driven by an internal combustion engine such as a reciprocating engine, or implemented by a fuel cell system.

The battery 80 is a secondary battery which is implemented by a lithium-ion battery in the present embodiment. The battery 80 functions as one of electric power sources in the eVTOL. The battery 80 supplies electric power mainly to a drive unit of an inverter circuit 40 included in the EDS 100, thereby driving the motor 30. It should be noted that the battery 80 may alternatively be implemented by other types of secondary batteries such as a nickel-metal hydride battery.

In the present embodiment, the EDS 100 includes the aforementioned motor 30, three-phase AC lines 35, the aforementioned inverter circuit 40, and the aforementioned power transmission unit 90. The EDS 100 is configured to rotationally drive rotary wings of the eVTOL.

Moreover, in the present embodiment, the motor 30, which is denoted by MG in the drawings, is implemented by a three-phase AC brushless motor. The motor 30 generates and outputs torque according to a voltage and current supplied from the inverter circuit 40 that will be described later. It should be noted that the motor 30 may alternatively be implemented by other types of motors, such as an induction motor or a reluctance motor. In addition, the motor 30 may also be implemented by a motor-generator that selectively functions either as an electric motor or as an electric generator.

The inverter circuit 40 is configured to drive the motor 30. Specifically, the inverter circuit 40 is configured to convert a DC voltage supplied from the battery 80 into a three-phase AC voltage and supply the resultant three-phase AC voltage to the motor 30 via the three-phase AC lines 35. The inverter circuit 40 has three legs provided respectively for U, V and W phases. Each of the three legs has a pair of upper-arm and lower-arm switching circuits 41 connected in series with each other. That is, the inverter circuit 40 includes a total of six switching circuits 41. In addition, the DC voltage supplied from the battery 80 to the inverter circuit 40 is smoothed by a capacitor.

Each of the switching circuits 41 includes a switching element 43. In the present embodiment, each of the switching elements 43 of the switching circuits 41 is implemented by a MOSFET (Metal-Oxide-Semiconductor Field-Effect Transistor). It should be noted that each of the switching elements 43 of the switching circuits 41 may alternatively be implemented by other types of switching elements such as an IGBT (Insulated-Gate Bipolar Transistor).

The power transmission unit 90 transmits electric power supplied from the battery 80 to the inverter circuit 40. The power transmission unit 90 includes filters and wiring that are provided to remove noise which may be caused by the electric power supply to the inverter circuit 40. More particularly, in the present embodiment, the power transmission unit 90 includes the aforementioned normal filter 50, a common filter 60 and PN lines 70.

The normal filter 50 is arranged between the inverter circuit 40 and the common filter 60. Both the normal filter 50 and the common filter 60 that will be described later are noise filters for suppressing noise generated by the inverter circuit 40.

The normal filter 50 is configured to suppress normal mode noise from flowing out from the inverter circuit 40 to the battery 80 side. Normal mode noise is also referred to as differential mode noise. Normal mode noise is noise which appears in a power supply line or the like due to the propagation of an abrupt voltage change or current change in a main circuit; the abrupt voltage change or current change is caused by switching of a switching element.

The normal filter 50 includes a normal reactor 51 and the aforementioned thermistor 52. The thermistor 52 is mounted to the normal reactor 51 and configured to detect the temperature of the normal filter 50.

The common filter 60 is arranged between the normal filter 50 and the PN lines 70. The common filter 60 is configured to suppress common mode noise from flowing out from the inverter circuit 40 to the battery 80 side. Common mode noise is noise in which electric potential fluctuation with respect to the ground causes charge/discharge of a stray capacitance existing between the main circuit and the ground or existing in a transformer or the like, thereby causing noise current to propagate through a ground line. Here, the electric potential fluctuation with respect to the ground is caused by switching of a switching element.

The common filter 60 includes a choke coil 61 and the aforementioned thermistor 62. The thermistor 62 is mounted to the choke coil 61 and configured to detect the temperature of the common filter 60.

The PN lines 70 are located between the battery 80 and the common filter 60. The PN lines 70 constitute wiring within the EDS 100 for supplying electric power from the battery 80 to the inverter circuit 40.

Figure 2:
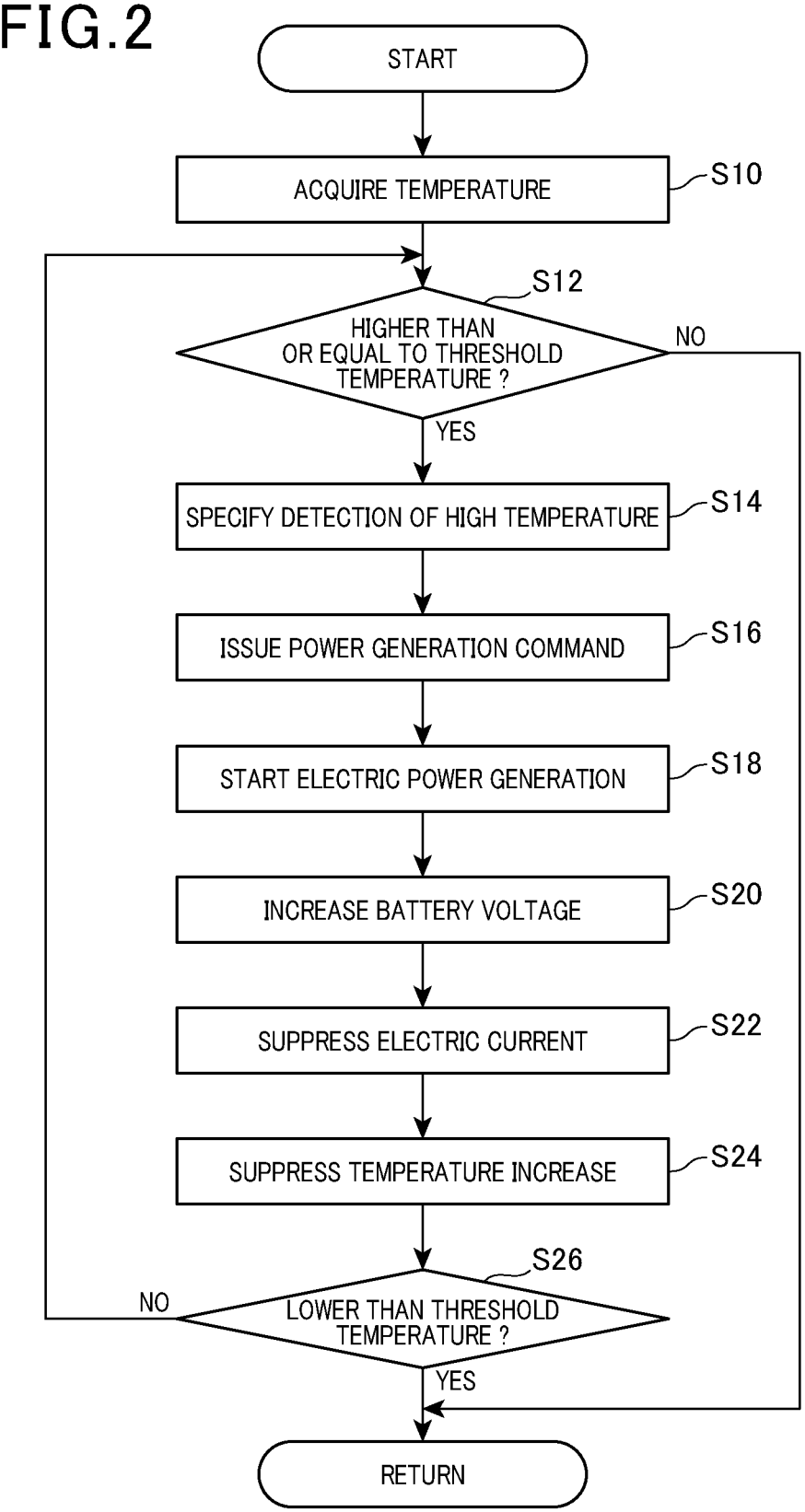
FIG. 2 is a flowchart illustrating a process of the control apparatus according to the first embodiment for controlling an electric power generation system.

FIG. 2 illustrates a process of the control apparatus 10 according to the present embodiment for controlling the electric power generation system 20. The control apparatus 10 starts performing this process upon start of an engine and start of operation of the EDS 100 with electric power supplied from the battery 80 to the EDS 100.

First, in step S10, the temperature acquisition unit 12 of the control apparatus 10 acquires the temperature of the normal filter 50 from the thermistor 52. It should be noted that in step S10, the temperature acquisition unit 12 may acquire the temperature of the common filter 60 from the thermistor 62 instead of the temperature of the normal filter 50 from the thermistor 52.

Next, in step S12, the temperature acquisition unit 12 determines whether the acquired temperature is higher than or equal to the predetermined threshold temperature.

If the acquired temperature is lower than the predetermined threshold temperature and thus the determination in step S12 results in a "NO" answer, the process returns to step S10.

In contrast, if the acquired temperature is higher than or equal to the predetermined threshold temperature and thus the determination in step S12 results in a "YES" answer, the process proceeds to step S14.

In step S14, the temperature acquisition unit 12 specifies that a high temperature has been detected. For example, the temperature acquisition unit 12 sets a high temperature detection flag.

In step S16, the power generation control unit 14 issues a power generation command to the electric power generation system 20.

In step S18, the electric power generation system 20 starts generating electric power according to the power generation command.

In step S20, with the electric power generated by the electric power generation system 20 in step S18, the output voltage (or the inter-terminal voltage) of the battery 80 is increased, thereby increasing the input voltage of the EDS 100.

It should be noted that step S20 can be regarded as a result of execution of step S18, not as an independent process.

The amount of heat generated by the power transmission unit 90 depends on the amount of electric current flowing therethrough. Specifically, the larger the amount of electric current flowing through the power transmission unit 90, the more heat is generated by the power transmission unit 90. Moreover, the output electric power from the inverter circuit 40 is determined by the product of electric current and voltage.

Therefore, in step S22, when the electric power supplied from the inverter circuit 40 to the motor 30 is constant, increase in the electric current flowing through the power transmission unit 90 is suppressed with increase in the output voltage of the battery 80.

Consequently, in step S24, with the suppression of increase in the electric current flowing through the power transmission unit 90, the heat generation in the power transmission unit 90 is suppressed, thereby suppressing increase in the temperature of the power transmission unit 90.

In step S26, the temperature acquisition unit 12 determines whether the temperature acquired from the thermistor 52 is lower than the predetermined threshold temperature.

If the temperature acquired from the thermistor 52 is lower than the predetermined threshold temperature and thus the determination in step S26 results in a "YES" answer, the process returns to step S10.

In contrast, if the temperature acquired from the thermistor 52 is higher than or equal to the predetermined threshold temperature and thus the determination in step S26 results in a "NO" answer, the process returns to step S12.

In addition, the thermistor 52 in the present embodiment corresponds to the first temperature sensor in the claims.

As described above, the control apparatus 10 according to the present embodiment includes the temperature acquisition unit 12 and the power generation control unit 14. The temperature acquisition unit 12 acquires a temperature of the power transmission unit 90, more particularly the temperature of the normal filter 50 of the power transmission unit 90 detected by the thermistor 52. When the temperature of the power transmission unit 90 acquired by the temperature acquisition unit 12 is higher than or equal to the predetermined threshold temperature, the power generation control unit 14 controls the electric power generation system 20 to generate electric power and charge the battery 80 (i.e., the secondary battery) with the generated electric power.

With the above configuration, when the temperature of the power transmission unit 90 is higher than or equal to the predetermined threshold temperature, it is possible to suppress decrease in the output voltage (or the inter-terminal voltage) of the battery 80 by charging the battery 80 with the electric power generated by the electric power generation system 20. Consequently, in the case of the supplied electric power being constant, it is possible to suppress increase in the electric current flowing through the power transmission unit 90. As a result, it is possible to suppress increase in the temperature of the power transmission unit 90 while maintaining the supplied electric power.

Second Embodiment

Figure 3:
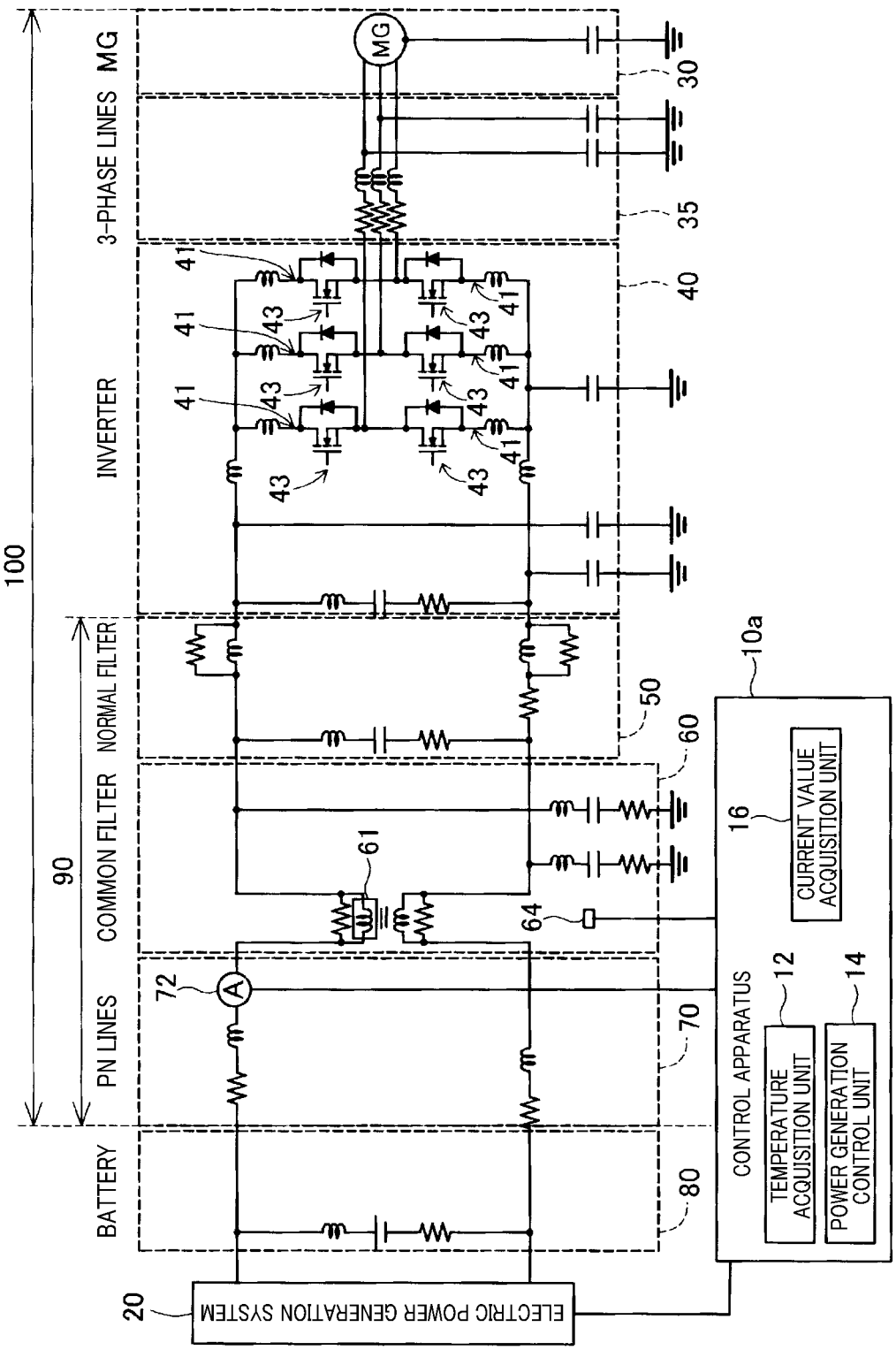
FIG. 3 is a schematic diagram illustrating the configurations of a control apparatus according to a second embodiment of the present disclosure.

FIG. 3 illustrates the configuration of a control apparatus 10*a* according to the second embodiment of the present disclosure. The configuration of the control apparatus 10*a* is similar to the configuration of the control apparatus 10 according to the first embodiment; therefore, only the differences therebetween will be described hereinafter.

As described above, the control apparatus 10 according to the first embodiment includes the temperature acquisition unit 12 and the power generation control unit 14 (see FIG. 1). Moreover, the control apparatus 10 according to the first embodiment performs the process shown in FIG. 2 for controlling the electric power generation system 20. In particular, in step S10 of the process, the temperature acquisition unit 12 of the control apparatus 10 acquires, as a temperature of the power transmission unit 90, the temperature of the normal filter 50 detected by the thermistor 52.

In contrast, as shown in FIG. 3, the control apparatus 10a according to the present embodiment further includes a current value acquisition unit 16 in addition to the temperature acquisition unit 12 and the power generation control unit 14. Moreover, although not shown in the drawings, the control apparatus 10a according to the present embodiment also performs a process for controlling the electric power generation system 20. The process performed by the control apparatus 10a differs from the process performed by the control apparatus 10 according to the first embodiment only in step S10.

Specifically, in step S10 of the process according to the present embodiment, the temperature acquisition unit 12 first acquires an ambient temperature of the power transmission unit 90 (i.e., a temperature of the installation environment of the power transmission unit 90) detected by an ambient temperature sensor 64. Then, the temperature acquisition unit 12 acquires a temperature of the power transmission unit 90 by calculating it based on the acquired ambient temperature.

As shown in FIG. 3, in the present embodiment, the ambient temperature sensor 64 is arranged in the common filter 60 of the power transmission unit 90. It should be noted that the ambient temperature sensor 64 may alternatively be arranged at other locations where the temperature detected by the sensor 64 can represent the ambient temperature of the power transmission unit 90 or locations where the temperature detected by the sensor 64 has a correlation with the ambient temperature of the power transmission unit 90 and thus the ambient temperature of the power transmission unit 90 can be estimated based on the temperature detected by the sensor 64. For example, the ambient temperature sensor 64 may alternatively be arranged in the normal filter 50 of the power transmission unit 90, in the inverter circuit 40, or even at a location outside the EDS 100.

The current value acquisition unit 16 acquires a current value measured by a current sensor 72 that is arranged on one of the PN lines 70. Similar to the temperature acquisition unit 12 and the power generation control unit 14, the current value acquisition unit 16 is a functional unit realized by a CPU included in the control apparatus 10a. In addition, instead of acquiring the current value measured by the current sensor 72, the current value acquisition unit 16 may acquire a value of the electric current flowing through the power transmission unit 90 by estimating it based on information on the output of the motor 30 and the battery voltage.

In the present embodiment, the temperature acquisition unit 12 calculates the temperature of the power transmission unit 90 by adding the amount of temperature increase $\Delta T$ of the power transmission unit 90 to the ambient temperature acquired from the ambient temperature sensor 64.

The temperature increase of the power transmission unit 90 is mainly due to heat generated by the choke coil 61. Therefore, in the present embodiment, the amount of temperature increase $\Delta T$ of the power transmission unit 90 is calculated as the product of the amount of heat Q (in W) generated by the choke coil 61 and the thermal resistance Rth (in °C./W) of the choke coil 61. That is, $\Delta T = Q \times Rth$. Moreover, the amount of heat Q generated by the choke coil 61 is calculated as the product of the square of the current value I detected by the current sensor 72 and the electrical resistance Rc of the choke coil 61. That is, $Q = I^2 \times Rc$. Furthermore, the electrical resistance Rc of the choke coil 61 is determined based on the material of the choke coil 61, the length of the choke coil 61 and the cross-sectional area of the choke coil 61.

In the present embodiment, temperature control is performed by the circulation of a coolant in the EDS 100. Specifically, the coolant is circulated by a pump through a circulation flow path formed in the EDS 100. Moreover, in the circulation flow path, there are arranged both a cooler member that abuts and thus exchanges heat with an inverter case housing the inverter circuit 40 and a cooler member that abuts and thus exchanges heat with the choke coil 61. Consequently, the temperatures of the inverter circuit 40 and the choke coil 61 are regulated through the heat exchange between the inverter circuit 40 and the choke coil 61 and the coolant flowing through the cooler members.

The thermal resistance Rth of the choke coil 61 is calculated as the sum of the thermal resistance Rth1 of that part of the choke coil 61 which abuts the cooler member and the thermal resistance Rth2 of the other parts of the choke coil 61. That is, Rth=Rth1+Rth2.

The thermal resistance Rth1 is calculated as the reciprocal of the product of the heat transfer coefficient $\alpha$ and the surface area LW of the choke coil 61. That is, $Rth1 = 1/(\alpha \times LW)$.

The thermal resistance Rth2 is calculated by the following equation: $Rth2 = t/(\lambda \times LW)$, where t is the thickness of the choke coil 61, $\lambda$ is the thermal conductivity of the choke coil 61 and LW is the surface area of the choke coil 61. In addition, the thickness t, the thermal conductivity $\lambda$ and the surface area LW of the choke coil 61 are determined in advance.

As above, in step S10 of the process according to the present embodiment, the temperature acquisition unit 12 acquires the temperature of the power transmission unit 90 by calculating it as the sum of the amount of temperature increase $\Delta T$ of the power transmission unit 90 and the ambient temperature detected by the ambient temperature sensor 64.

In addition, the ambient temperature sensor 64 in the present embodiment corresponds to the second temperature sensor in the claims.

As described above, in the control apparatus 10a according to the present embodiment, the temperature acquisition unit 12 first acquires the ambient temperature from the ambient temperature sensor 64 that detects the ambient temperature of the power transmission unit 90 (i.e., the temperature of the installation environment of the power transmission unit 90). Then, the temperature acquisition unit 12 acquires the temperature of the power transmission unit 90 by calculating it based on the acquired ambient temperature. Specifically, the temperature acquisition unit 12 calculates the temperature of the power transmission unit 90 as the sum of the amount of temperature increase $\Delta T$ of the power transmission unit 90, which is obtained by the above-described calculation, and the ambient temperature detected by the ambient temperature sensor 64. Consequently, it becomes possible to suppress, taking into account the ambient temperature, increase in the temperature of the power transmission unit 90 while maintaining the supplied electric power.

While the above particular embodiments have been shown and described, it will be understood by those skilled in the art that various modifications, changes and improvements may be made without departing from the spirit of the present disclosure.

For example, in the first embodiment, the control apparatus 10, the electric power generation system 20, the battery 80 and the EDS 100 are installed in an eVTOL. However, the control apparatus 10, the electric power generation system 20, the battery 80 and the EDS 100 may alternatively be installed in any types of moving objects other than aircraft, such as automobiles and ships, or any types of non-moving objects.

What is claimed is:

1. A control apparatus for an electric power generation system,
    the electric power generation system being configured to generate electric power and charge a secondary battery, which is an electric power source of a motor included in an electric drive system, with the generated electric power,
    the electric drive system further including, in addition to the motor, an inverter circuit configured to drive the motor and a power transmission unit configured to transmit electric power from the secondary battery to the inverter circuit, the power transmission unit including a noise filter, and
    the control apparatus comprising:
        a temperature acquisition unit configured to acquire a temperature of the power transmission unit; and
        a power generation control unit configured to control the electric power generation system to generate electric power, when the temperature of the power transmission unit acquired by the temperature acquisition unit is higher than or equal to a predetermined threshold temperature, and charge the secondary battery with the generated electric power.

2. The control apparatus as set forth in claim 1, wherein the electric drive system further includes a first temperature sensor configured to detect the temperature of the power transmission unit, and
    the temperature acquisition unit is configured to acquire the temperature of the power transmission unit detected by the first temperature sensor.

3. The control apparatus as set forth in claim 1, further comprising a current value acquisition unit configured to acquire a value of electric current flowing through the power transmission unit, wherein
    the temperature acquisition unit is configured to acquire the temperature of the power transmission unit by:
        acquiring an ambient temperature of the electric drive system from a second temperature sensor that is configured to detect the ambient temperature of the electric drive system; and
        calculating the temperature of the power transmission unit based on both the acquired ambient temperature and the value of the electric current acquired by the current value acquisition unit.

4. The control apparatus as set forth in claim 1, wherein the electric drive system is installed in an aircraft, and
    the power generation control unit is configured to control the electric power generation system to generate electric power and thereby enable the motor to output mechanical power higher than a predetermined threshold value, the mechanical power higher than the predetermined threshold value being required for flight of the aircraft.

5. A control apparatus for an electric power generation system,
    the electric power generation system being configured to generate electric power and charge a secondary battery, which is an electric power source of a motor included in an electric drive system, with the generated electric power,
    the electric drive system further including, in addition to the motor: (i) an inverter circuit configured to drive the motor; (ii) a power transmission unit configured to transmit electric power from the secondary battery to the inverter circuit; and (iii) a first temperature sensor configured to detect the temperature of the power transmission unit, and
    the control apparatus comprising:
        a temperature acquisition unit configured to acquire a temperature of the power transmission unit detected by the first temperature sensor; and
        a power generation control unit configured to control the electric power generation system to generate electric power, when the temperature of the power transmission unit acquired by the temperature acquisition unit is higher than or equal to a predetermined threshold temperature, and charge the secondary battery with the generated electric power.

6. The control apparatus as set forth in claim 5, further comprising a current value acquisition unit configured to acquire a value of electric current flowing through the power transmission unit, wherein
    the temperature acquisition unit is configured to acquire the temperature of the power transmission unit by:
        acquiring an ambient temperature of the electric drive system from a second temperature sensor that is configured to detect the ambient temperature of the electric drive system; and
        calculating the temperature of the power transmission unit based on both the acquired ambient temperature and the value of the electric current acquired by the current value acquisition unit.

7. The control apparatus as set forth in claim 5, wherein the electric drive system is installed in an aircraft, and
    the power generation control unit is configured to control the electric power generation system to generate electric power and thereby enable the motor to output mechanical power higher than a predetermined threshold value, the mechanical power higher than the predetermined threshold value being required for flight of the aircraft.

8. A control apparatus for an electric power generation system,
    the electric power generation system being configured to generate electric power and charge a secondary battery, which is an electric power source of a motor included in an electric drive system, with the generated electric power,
    the electric drive system further including, in addition to the motor, an inverter circuit configured to drive the motor and a power transmission unit configured to transmit electric power from the secondary battery to the inverter circuit, and
    the control apparatus comprising:
        a temperature acquisition unit configured to acquire a temperature of the power transmission unit;
        a power generation control unit configured to control the electric power generation system to generate electric power, when the temperature of the power transmission unit acquired by the temperature acquisition unit is higher than or equal to a predetermined threshold temperature, and charge the secondary battery with the generated electric power; and a current value acquisition unit configured to acquire a value of electric current flowing through the power transmission unit, wherein the temperature acquisition unit is configured to acquire the temperature of the power transmission unit by:

acquiring an ambient temperature of the electric drive system from a second temperature sensor that is configured to detect the ambient temperature of the electric drive system; and calculating the temperature of the power transmission unit based on both the acquired ambient temperature and the value of the electric current acquired by the current value acquisition unit.

9. The control apparatus as set forth in claim 8, wherein the electric drive system is installed in an aircraft, and the power generation control unit is configured to control the electric power generation system to generate electric power and thereby enable the motor to output mechanical power higher than a predetermined threshold value, the mechanical power higher than the predetermined threshold value being required for flight of the aircraft.

\* \* \* \* \*